(12) United States Patent
Kumano et al.

(10) Patent No.: US 8,909,984 B2
(45) Date of Patent: Dec. 9, 2014

(54) NODE APPARATUS OF MULTI-NODE STORAGE SYSTEM AND METHOD FOR MANAGING PROCESSING SPEED

(71) Applicant: Fujitsu Limited, Kawasaki-shi (JP)

(72) Inventors: Tatsuo Kumano, Kawasaki (JP); Yasuo Noguchi, Kawasaki (JP); Munenori Maeda, Yokohama (JP); Masahisa Tamura, Kawasaki (JP); Ken Iizawa, Yokohama (JP); Toshihiro Ozawa, Yokohama (JP); Jun Kato, Kawasaki (JP); Kazuichi Oe, Yokohama (JP); Kazutaka Ogihara, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 13/798,308

(22) Filed: Mar. 13, 2013

(65) Prior Publication Data
US 2013/0246840 A1 Sep. 19, 2013

(30) Foreign Application Priority Data
Mar. 19, 2012 (JP) ................................. 2012-061728

(51) Int. Cl.
*G06F 11/00* (2006.01)
*G06F 11/20* (2006.01)
*G06F 11/10* (2006.01)

(52) U.S. Cl.
CPC ........ *G06F 11/2053* (2013.01); *G06F 11/2069* (2013.01); *G06F 11/1088* (2013.01)
USPC ................. 714/6.21; 714/6.2; 714/2

(58) Field of Classification Search
USPC ................................. 714/2, 6.1, 6.2, 6.21, 25
See application file for complete search history.

(56) References Cited

U.S. PATENT DOCUMENTS

| | | | | |
|---|---|---|---|---|
| 6,493,826 | B1 * | 12/2002 | Schofield et al. | 726/22 |
| 8,117,491 | B2 * | 2/2012 | Nishimiya | 714/6.11 |
| 8,156,381 | B2 | 4/2012 | Tamura et al. | |
| 2007/0067666 | A1 * | 3/2007 | Ishikawa et al. | 714/6 |
| 2008/0126844 | A1 * | 5/2008 | Morita et al. | 714/6 |
| 2009/0164844 | A1 * | 6/2009 | Tamura et al. | 714/25 |

FOREIGN PATENT DOCUMENTS

| | | |
|---|---|---|
| JP | 05-158625 | 6/1993 |
| JP | 2005-050007 | 2/2005 |
| JP | 2009-151519 | 7/2009 |

* cited by examiner

*Primary Examiner* — Sarai Butler
(74) *Attorney, Agent, or Firm* — Fujitsu Patent Center

(57) ABSTRACT

A storage management apparatus manages a plurality of storage apparatuses in a storage system that disperses and stores data that is made redundant so as to have a predetermined redundancy level. The storage management apparatus includes: a patrol process unit that performs, at a patrol speed, a patrol process of confirming that the plurality of storage apparatuses are being operated normally; a relocating process unit that performs, at a relocating process speed, a relocating process of moving the data between the plurality of storage apparatuses; a recovery process unit that performs, at a recovery process speed, a recovery process of recovering the redundancy level of the data when a fault occurs in the plurality of storage apparatuses; and a processing speed control unit that controls the recovery process speed or a sum of the patrol process speed and the relocating process speed to have a predetermined value.

20 Claims, 9 Drawing Sheets

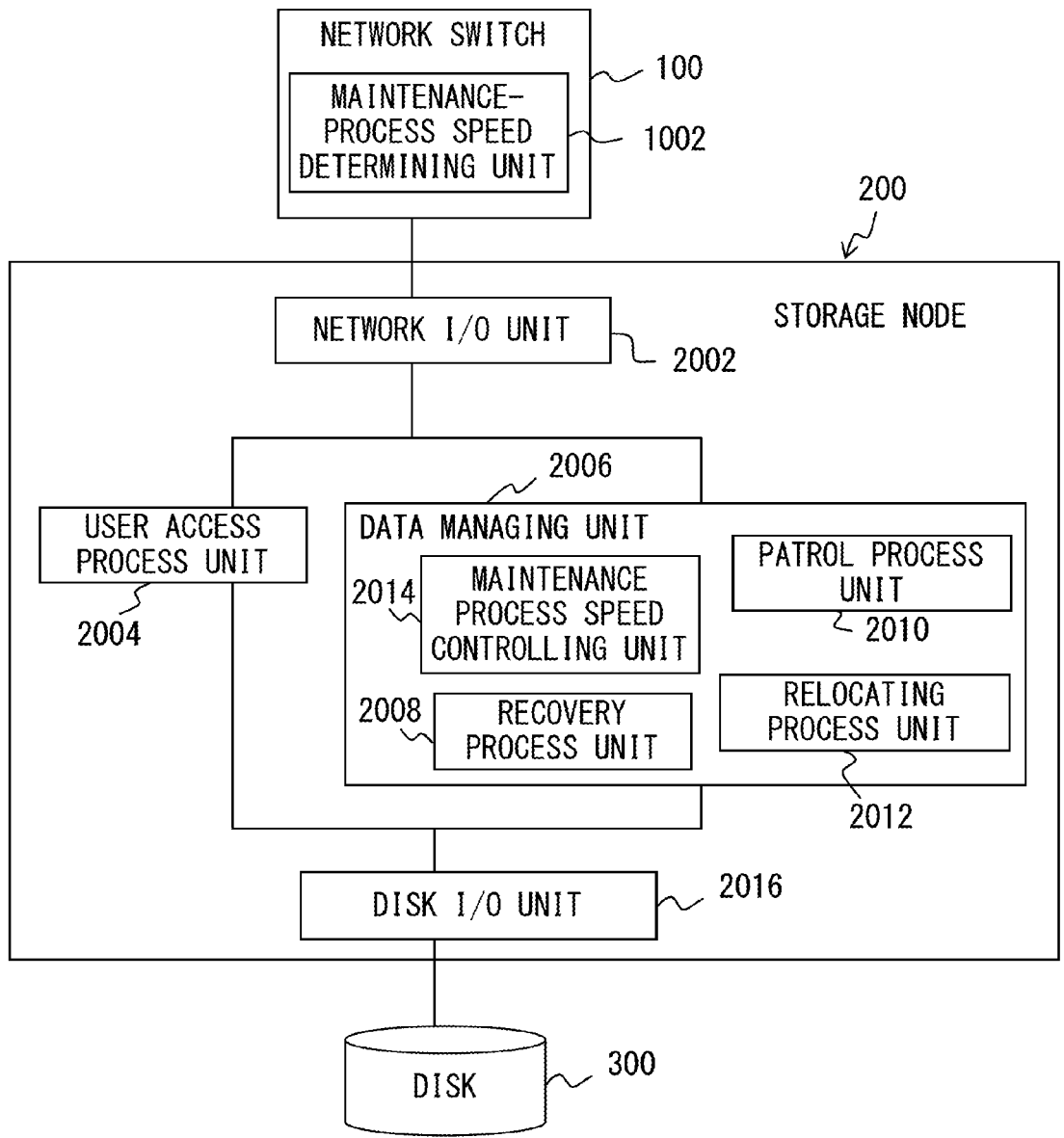
F I G. 3

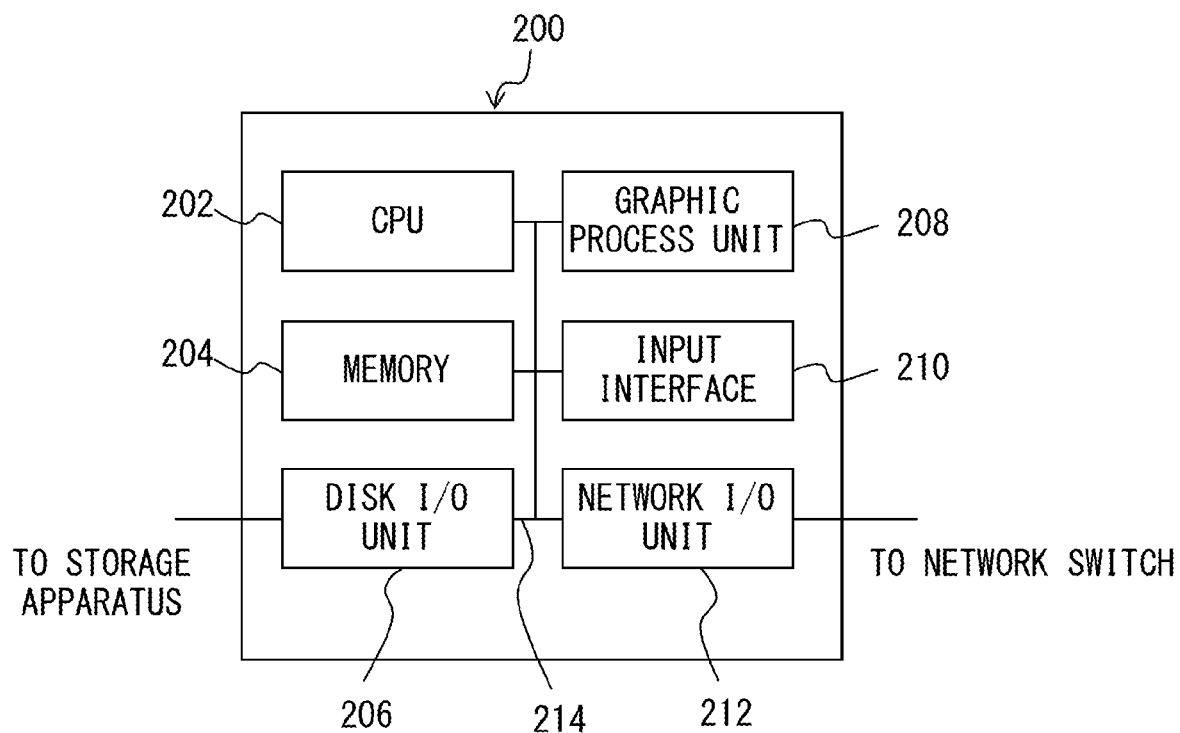
F I G. 4

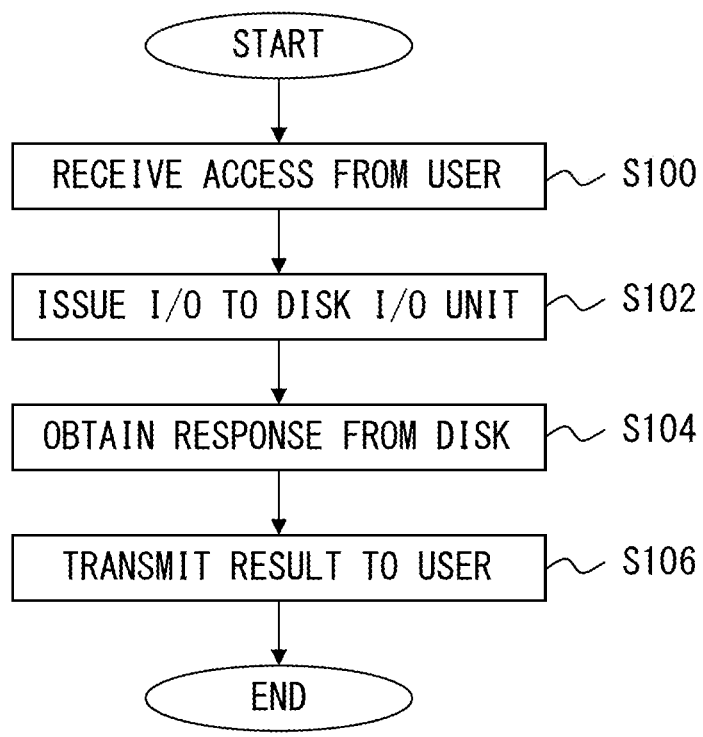
F I G. 5

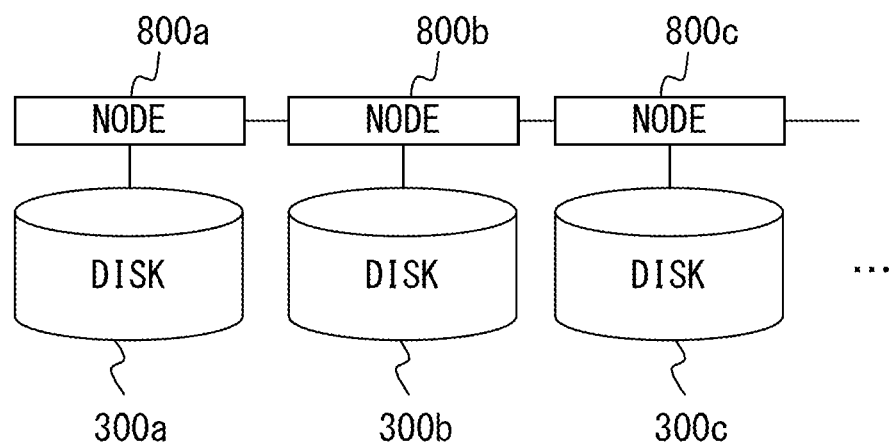
F I G. 8

NODE APPARATUS OF MULTI-NODE STORAGE SYSTEM AND METHOD FOR MANAGING PROCESSING SPEED

CROSS-REFERENCE TO RELATED APPLICATION

This application is based upon and claims the benefit of priority of the prior Japanese Patent Application No. 2012-061728, filed on Mar. 19, 2012, the entire contents of which are incorporated herein by reference.

FIELD

The embodiments described herein are related to a node apparatus of a storage system and a method for managing the storage system and are particularly related to a node apparatus of a multi-node storage system that dispersion-manages data using a plurality of storage nodes and to a method for managing a processing speed.

BACKGROUND

Storage systems are used to save data that is used to process a computer. In recent years, multi-node storage systems (dispersion storage systems) have been used that dispersion-manage data using a plurality of storage nodes in order to save a large quantity of data and to enhance reliability.

The multi-node storage system includes a plurality of storage nodes and a storage apparatus connected to each storage node. The plurality of storage nodes are connected via a network. In response to an instruction transmitted through the network, each storage node manages a storage apparatus that is provided within the storage node or connected to the outside and that stores data. In general, in the multi-node storage system, a virtual storage apparatus is defined. In addition, in the multi-node storage system, a redundant configuration is typically provided. In the redundant configuration, redundancy is achieved such that the same data is stored in each of a plurality of logic devices in order to improve, for example, the safety of data. As an example, by storing the same data in two logic devices, the data is duplicated. In this case, the redundancy level is two.

Such a multi-node storage system allows a user to use a storage apparatus connected to a plurality of storage nodes in the same manner as local storage.

In such a multi-node storage system, when a fault occurs in a certain storage apparatus, this storage apparatus becomes inaccessible, thereby breaking the duplicated state of some pieces of data. In this case, to recover the data-duplicated state, a recovery process is performed. In the recovery process, a new portion of a logic device is assigned to data for which the duplicated state has been broken, i.e., data to be recovered. Data is then copied from the existing portion of the logic device assigned to the data to be recovered to the new portion of the logic device. In this way, the data-duplicated state is recovered.

In the multi-node storage system, it is necessary to diagnose whether or not a storage apparatus of the system is being operated normally. For the diagnosis, an existence confirmation is typically performed to diagnose whether the storage apparatus is being operated. The diagnosis via the existence confirmation may be finished in a relatively short time, and, in general, the processing load is not heavy. Accordingly, the diagnosis via the existence confirmation does not greatly affect normal processing by the system.

It is necessary to diagnose, for example, whether data at each storage node having a redundant configuration is adequately holding the redundant configuration. As an example, under a condition in which a redundant configuration is achieved between storage apparatuses, when a fault in one region is found, restoration can be achieved via a recovery process. However, when a fault occurs simultaneously in two regions associated with each other by a redundant configuration, data cannot be restored. As a result, it is necessary to not only perform the existence confirmation for the storage apparatuses but also to diagnose whether or not a fault has occurred for all regions of the storage apparatuses. This process is referred to as a patrol process. The diagnosis method includes, for example, a method wherein data is read to investigate whether an error will occur, a method wherein data that was read is written and is then read again to investigate whether the content is the same, and a method wherein data is read between nodes to confirm whether the content is the same.

In such a multi-node storage system, the performance of the entire system is affected by how data is located among storage apparatuses. For example, access concentration on a particular storage apparatus leads to performance degradation such as a delay in data access. Accordingly, a technology is known wherein, in order to prevent the performance of data access from being degraded, a process is performed of relocating data to achieve proper data locating in accordance with a resource amount of or load on each storage node.

In a multi-node storage system including a plurality of storage nodes and in which data is multiplexed and stored, when a fault occurs in a storage node, a recovery process is performed to recover the redundancy level. As an example, in a multi-node storage system configured by RAID 5, when one storage node fails, a recovery process is performed in which data is copied to a storage apparatus of a new storage node from another normal storage node that stores the same data as data stored in the storage apparatus of the storage node that has failed. In this way, the system recovers the redundancy level. However, during the recovery process, normal processes and the process of recovering the redundancy level are performed in parallel with each other, thereby decreasing, for example, an observable processing speed of the system, such as the speed of a process under a user request.

In the designing stage of a multi-node storage system, it is difficult to predict loads on the entire system that will be applied during a recovery process. Accordingly, it is difficult to design a multi-node storage system such that the system performance is not decreased even when a fault occurs, and observable system performances achieved during a normal operation are thus different from those during the occurrence of a failure.

In view of these factors, there is a problem of difficulty in estimating a time required for the multi-node storage system to perform a certain processing series.

Therefore, a multi-node storage system is required wherein an observable system processing speed achieved during a normal period during which a relocating process and a patrol process are performed in addition to a normal process under an instruction input by a user is the same as an observable system processing speed achieved during a fault occurrence period during which a recovery process is performed in addition to a normal process under an instruction input by the user.

Patent document 1: Japanese Laid-open Patent Publication No. 2009-151519

Patent document 2: Japanese Laid-open Patent Publication No. 05-158625

Patent document 3: Japanese Laid-open Patent Publication No. 2005-050007

SUMMARY

A apparatus manages a plurality of storage apparatuses in a storage system that disperses and stores in the plurality of storage apparatuses data that is made redundant so as to have a predetermined redundancy level. The storage management apparatus includes a patrol process unit that performs, at a patrol speed, a patrol process of confirming that the plurality of storage apparatuses are being operated normally; a relocating process unit that performs, at a relocating process speed, a relocating process of moving the data between the plurality of storage apparatuses; a recovery process unit that performs, at a recovery process speed, a recovery process of recovering the redundancy level of the data when a fault occurs in the plurality of storage apparatuses; and a processing speed control unit that outputs an instruction on an operation at the patrol process unit, the relocating process unit, and the recovery process unit in such a manner that the recovery process speed or a sum of the patrol process speed and the relocating process speed becomes a predetermined value.

BRIEF DESCRIPTION OF DRAWINGS

FIG. 3 is a functional block diagram of a storage node of an example of a multi-node storage system in accordance with an embodiment of the present invention.

FIG. 4 illustrates an exemplary hardware configuration of a storage node of an example of a multi-node storage system in accordance with an embodiment of the present invention.

FIG. 5 is a flowchart of processes performed by a user access process unit of a storage node of an example of a multi-node storage system in accordance with an embodiment of the present invention.

FIG. 8 illustrates a connection between storage nodes and storage apparatuses of another example of a multi-node storage system in accordance with an embodiment of the present invention.

DESCRIPTION OF EMBODIMENTS

Figure 1:
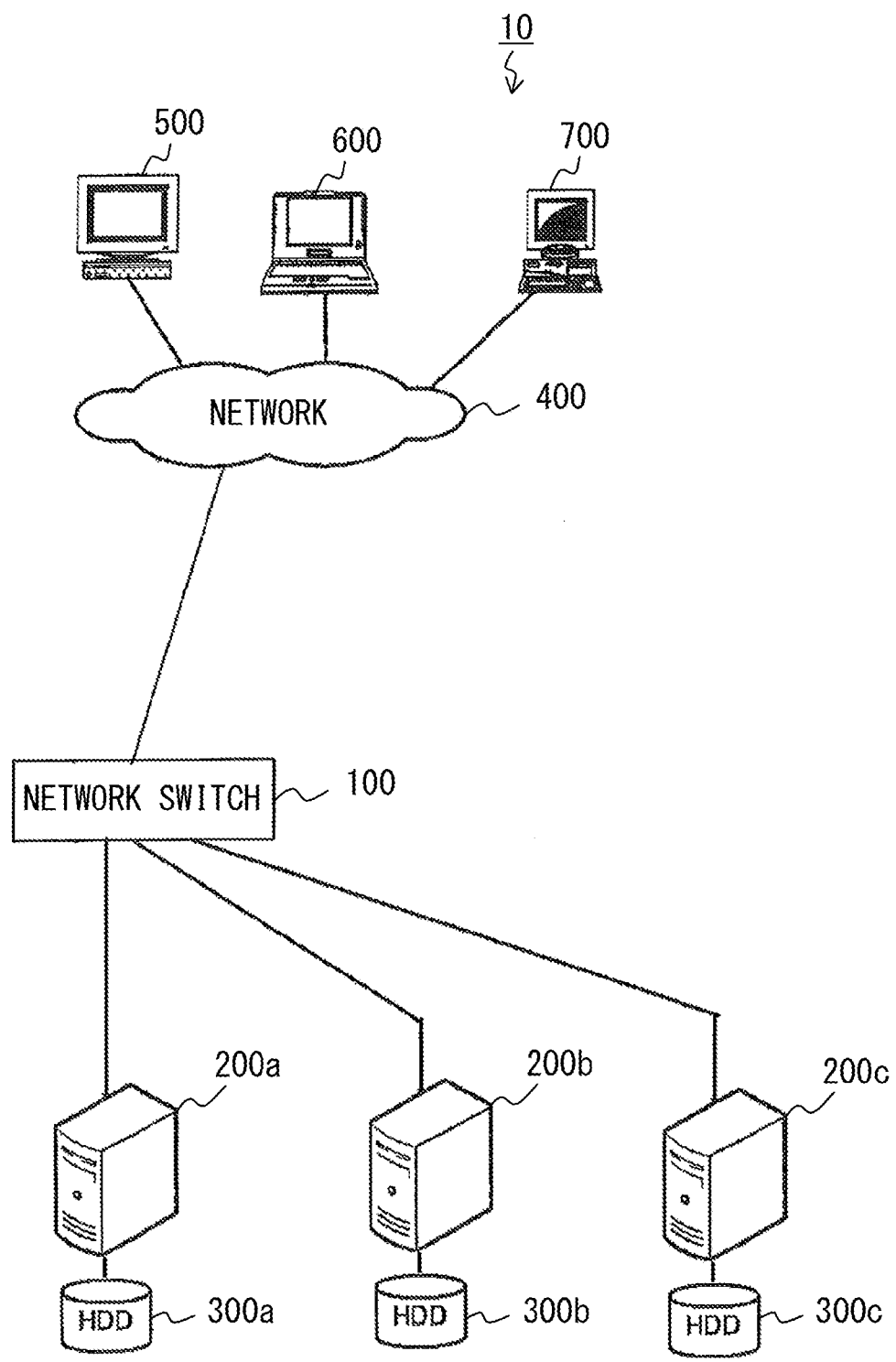
FIG. 1 illustrates an example of a multi-node storage system in accordance with an embodiment of the present invention.

In the following, embodiments of the present invention will be described with reference to the drawings. In the drawings, like parts or parts providing like functions are indicated by the same or like reference signs so that overlapping descriptions can be omitted.

<System Configuration>

First, with reference to FIG. 1 to FIG. 4, descriptions will be given of an exemplary configuration of a multi-node storage system 10 in accordance with an embodiment of the present invention. The multi-node storage system 10 disperses and stores in a plurality of storage apparatuses data that is made redundant so as to have a predetermined redundancy level. The multi-node storage system 10 provides an example of a system wherein an observable system processing speed achieved during a normal period during which a relocating process and a patrol process are performed in addition to a normal user access process of processing an instruction input by a user are the same as an observable system processing speed achieved during a fault occurrence period during which a recovery process is performed in addition to the user access process.

Since the relocating process and the patrol process are performed during the normal period and the recovery process is performed at a predetermined processing speed during the fault occurrence period, the observable system processing speed achieved during the normal period is the same as that during the fault occurrence period, thereby allowing a time required to perform a certain processing series to be estimated.

In the following, the term "processing speed" is defined by the number of I/O transactions processed per unit time, i.e., this term is defined by throughput or the number of times an I/O process (a reading/writing process) is performed per second (IOPS). The sum of two processing speeds means the sum of the number of I/O transactions processed per unit time in two processes. That is, for a process A in which x1 transactions are processed per unit time and a process B in which x2 transactions are processed per unit time, the sum of the processing speed of the process A and the processing speed of the process B is a speed at which (x1+x2) transactions are processed per unit time. That is, an operation for calculating the sum of processing speeds corresponds to the performing of parallel processes.

In the following, the term "fault" includes a situation in which some pieces of data become inaccessible and a redundancy of some pieces of data is broken.

In the multi-node storage system 10, which will be described hereinafter, a speed at which the relocating process and the patrol process are performed during the normal period is the same as a speed at which the recovery process is performed during the fault occurrence period. In actual operations, the speed at which the relocating process and/or the patrol process are performed during the normal period or the speed at which the recovery process is performed during the failure occurrence period show some variation. In the multi-node storage system 10, which will be disclosed hereinafter, even when a speed at which the relocating process and/or the patrol process are performed during the normal period or a speed at which the recovery process is performed during the fault occurrence period is equal to or less than a predetermined speed, surplus resources are not used for a user access process of processing an instruction input by a user, thereby preventing observable system processing speeds from changing. When heavy loads are caused by the relocating process and the patrol process performed during the normal period or by the recovery process performed during the fault occurrence period, the user access process will be performed at a user access process speed without performing the relocating process and/or the patrol process or the recovery process. Using such a configuration allows a constant processing speed of the user access process to always be maintained.

Figure 2:
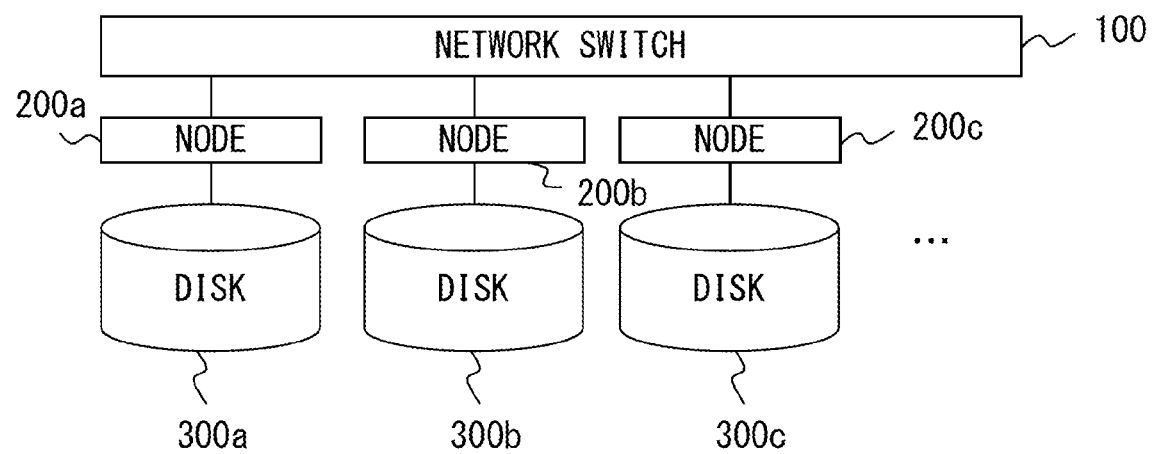
FIG. 2 illustrates a portion of an example of a multi-node storage system in accordance with an embodiment of the present invention.

FIG. 1 illustrates an example of the multi-node storage system 10 in accordance with an embodiment of the present invention. FIG. 2 illustrates a portion of the example of the multi-node storage system 10 illustrated in FIG. 1. In the multi-node storage system 10 in this example, a plurality of storage node apparatuses (hereinafter each may simply be referred to as a "node") 200a, 200b, and 200c are connected via a network switch 100 connected to a network 500 (note that a representative storage node apparatus may hereinafter be referred to as a storage node apparatus 200). The storage node apparatuses 200a, 200b, and 200c are respectively connected to storage apparatuses (hereinafter each may simply be referred to as a "disk") 300a, 300b, and 300c (note that a representative storage apparatus may hereinafter be referred to as a storage apparatus 300). In this example, as illustrated in FIG. 2, a plurality of storage nodes 200a, 200b, and 200c are connected to the network switch 100.

The storage apparatuses 300a, 300b, and 300c each include a hard disk apparatus (HDD) to store data. In this example, hard disk apparatuses are used as media that store data, but, as long as the media store data, they are not limited to hard disk drives. The medium may be an optical disk such as an HD-DVD.

The storage apparatuses 300a, 300b and 300c of the multi-node storage system 10 actually store data. Data stored in the storage apparatuses 300a, 300b and 300c is managed, and the managed data is transmitted to the network switch 100. Data stored in the storage apparatuses 300a, 300b and 300c is made redundant. In a redundant configuration, redundancy is achieved such that the same data is stored in each of a plurality of logic devices in order to improve, for example, the safety of data.

In the multi-node system 10, data is accessed via a virtual storage apparatus. In this case, metadata manages assignment of a storage region within the virtual storage apparatus and a storage region within the storage apparatuses 300a, 300b and 300c. The virtual storage apparatus is configured in units of segments. A storage capacity of a segment means a storage capacity of a slice, which is a unit of management at the storage apparatuses 300a, 300b and 300c. In the case of, for example, the storage capacity of a slice that is 1 GB, the storage capacity of the slice is also 1 GB. The storage capacity of the virtual storage apparatus is an integral multiple of the storage capacity of a segment.

Information stored in the storage apparatuses 300a, 300b and 300c includes information related to a device, metadata that stores information related to a slice, and data of the slice associated with a segment. Two slices, a primary slice and a secondary slice, are assigned to one segment and are made redundant to achieve redundancy level 2. The primary slice is designated as a destination of access from the storage nodes 200a, 200b and 200c, and the primary slice stores data for the segment. The secondary slice stores the same data as the data in the primary slice, i.e., the data is mirrored. The network switch 100 may dynamically determine, for example, which segment the slice is to be associated with and which of the primary slice and the secondary slice is to be used. At the storage apparatus that has been made redundant, in response to a readout request, data is read from the primary slice. In response to a write request, mirroring is performed to write data in the secondary slice and the data is then written in the primary slice.

The network switch 100 is connected to a network 400 and a plurality of storage node 200a, 200b or 200c. The network switch 100 performs a node managing process of managing the storage nodes 200a, 200b and 200c. As an example, upon receipt of a report from the storage nodes 200a, 200b and 200c that a new storage apparatus has been connected to the node, the network switch 100 defines a new virtual storage apparatus, allows the newly connected storage apparatus to store data, and allows the stored data to be accessed.

A plurality of terminal apparatuses 500, 600 and 700 are also connected to the network switch 100 via the network 400. In response to a user request to access a virtual storage apparatus input to the terminal apparatus 500, 600 or 700, the network switch 100 accesses corresponding data stored in the storage apparatus 300a, 300b or 300c.

As illustrated in FIG. 3, the network switch 100 includes a maintenance-process speed determining unit 1002. The maintenance process is a generic name for a patrol process of confirming that the plurality of storage apparatuses 300a, 300b and 300c are being operated normally, a relocating process of moving the data between the plurality of storage apparatuses 300a, 300b and 300c, and a recovery process of recovering the redundancy level of the data when some pieces of the data become inaccessible and the redundancy of these pieces of data is broken due to an error occurrence in the plurality of storage apparatuses 300a, 300b and 300c.

To estimate the performance at the recovery process, which will be described hereinafter, the maintenance-process speed determining unit 1002 makes an access corresponding to an assumed typical access pattern simultaneously with an access corresponding to recovery so as to investigate the performance. As an example, under a condition in which one I/O size is 4 KiB, the number of times a reading/writing process is performed per second (input output per second, or IOPS) is investigated in the performing of reading/writing under a mixed pattern of random reading and random writing. Generally, kibibyte indicates the capacity of a computer or the size of a storage apparatus, and 1 KiB is 1024 B and 1 MiB is 1,048,576 B. Alternatively, the number of times a reading/writing process is performed per second (input output per second, or IOPS) is investigated in the performing of sequential reading/writing while changing throughput. The number of I/Os (the number of times a reading/writing process is performed) per second (IOPS) is used as a processing speed. The processing speed is preferably measured before the system 10 is operated. However, while the system 10 is being operated, the number of storage apparatuses may be increased or decreased. In such a case, the processing speed may be measured when the configuration of the multi-node storage system 10 changes.

The maintenance-process speed determining unit 1002 determines a maintenance process speed according to reliability information of a device and a measurement result of measuring a processing speed in an advance preparation. As an example, in the case of holding data whose redundancy level is two or greater, when an average failure interval of the storage nodes 200a, 200b and 200c in the system scale is X1 seconds and the node capacity is S mebibytes, the recovery speed is made to be equal to or greater than S/T [MiB/sec]. When the maintenance-process speed determining unit 1002 performs, at this throughput, sequential I/O on the storage apparatuses 300a, 300b and 300c, the IOPS of random I/O that is within an allowable range is used as the maintenance process speed.

Alternatively, according to only the measurement result in an advance preparation, a maintenance process speed may be set such that an IOPS observable to the user becomes a predetermined value. In this case, the throughput of sequential I/O corresponding to the IOPS of random I/O that is Y1 is defined as the maintenance process speed.

Alternatively, when an I/O size distribution of user access is recognized in advance, a maintenance process speed may be determined by combining this distribution with a result of measurement of the number of times sequential I/O is performed.

In addition, a guaranteed repairing period may be used as a method for determining a maintenance process speed. When, for example, it is ensured that the repairing period is performed within T [sec] and the node capacity is S mebibytes, the maintenance process speed may be equal to or greater than S/T [MiB/sec].

Any of the terminal apparatuses 500, 600 and 700 may be a managing node. The managing node is a terminal used by an administrator in order to manage the entirety of the multi-node storage system 10. As an example, the managing node collects information such as a use condition and an operating condition of the storage apparatuses 300a, 300b and 300c and provides a display showing the information to the administrator. The administrator references the displayed information, and, when, for example, a storage apparatus on which a recovery process needs to be performed is found, the administrator makes an input to the managing node such that the recovery process is performed on the storage apparatus. The managing node transmits a request to perform the recovery process on the storage apparatus via the network switch 100.

FIG. 3 is a functional block diagram of a storage node 200 of an example of a multi-node storage system in accordance with an embodiment of the present invention. The storage node 200 includes a network I/O unit 2002, a user access process unit 2004, a data managing unit 2006, and a disk I/O unit 2016. The data managing unit 2006 further includes a recovery unit 2008, a patrol unit 2010, and a relocating unit 2012. The disk I/O unit 2016 includes a processing speed controlling unit 2014. The storage node 200 includes a processor that is configured to perform processes defined by the aforementioned and below-mentioned units.

The network I/O unit 2002 is connected to the network switch 100. Via the network switch 100, the network I/O unit 2002 transmits data to or receives data from a computer connected to another storage node or the network 400.

The user access process unit 2004 processes a request to access data which has been input by a user via the terminal 500, 600 or 700 and which has been received by the network I/O unit 2002. The request to access data includes a request to read data and a request to write data.

The user access process unit 2004 measures a speed of a process performed in connection with a user request to access data as a user access process speed. In addition, the measured data is transmitted to the data managing unit 2006. The user access process speed may be a throughput. The user access process speed may be determined according to a response speed. A response time is typically defined as the reciprocal of an IOPS. To measure the response time, the user access process unit 2004 issues a read command/write command (I/O) to the disk I/O unit 2016 in response to the user request to access data. The time that elapses before a response to the issued read command/write command is received is measured as the response time. The response time is typically defined as the sum of an average seek time, an average rotational delay time, and a data transfer time.

At ordinary times in the system, regardless of whether a user has made a request to access data stored in the storage apparatus 300, the data managing unit 2006 performs a maintenance process for maintenance of the disk 300 at a predetermined speed. The maintenance process includes the relocating process, the patrol process, and the recovery process. The data managing unit 2006 includes a relocating process unit 2008 to perform the relocating process, a patrol process unit 2010 to perform the patrol process, and a recovery process unit 2012 to perform the recovery process.

In the relocating process, pieces of data stored in the storage apparatuses 300a, 300b and 300c are dispersed to disperse loads on the storage nodes 200a, 200b and 200c, and the data is moved between the storage apparatuses 300a, 300b and 300c in order to equalize the amounts of use of the storage apparatuses 300a, 300b and 300c.

To perform the relocating process, information related to statistics for data access is needed. This process is performed by the network switch 100. At a predetermined timing, the network switch 100 collects, from each of the storage nodes 200a, 200b and 200c, access statistical information related to statistics for access. The access statistical information is the number of accesses that are made per predetermined period of time to the storage apparatuses 300a, 300b and 300c respectively managed by the storage nodes 200a, 200b and 200c.

According to the collected access statistical information, the network switch 100 determines an appropriate data location. Data may be relocated to enhance a process efficiency or may be relocated to save electricity. In a relocating process aimed at the enhancing of the process efficiency, the network switch 100 relocates data in such a manner that the storage apparatuses 300a, 300b and 300c are equally accessed. That is, the network switch 100 gives an instruction to the storage nodes 200a, 200b and 200c to relocate data in such a manner that the number of accesses made per predetermined time period to each of the storage apparatuses 300a, 300b and 300c becomes equal.

In a relocating process aimed at the saving of electricity, according to collected access statistical information, the network switch 100 calculates a probability of each of the storage apparatuses 300a, 300b and 300c being not accessed for a predetermined period of time after data is relocated. From possible data-location patterns, the network switch 100 selects a location pattern with the highest expected value with respect to a situation in which none of the storage apparatuses 300a, 300b and 300c are accessed for a predetermined period of time. The network switch 100 then gives the storage nodes 200a, 200b and 200c an instruction to relocate data in accordance with the selected location pattern.

The patrol process is a process of confirming that the storage apparatuses 300a, 300b and 300c are being operated normally in order to confirm data maintainability. In particular, data stored in a certain region of the storage apparatuses 300a, 300b and 300c is read via a virtual storage apparatus and is then written to the region in which this data was stored. The patrol process also includes a matching process of checking whether an error has occurred after the writing. Data is redundant, and accordingly, the patrol process also includes a process of reading data from each of the storage apparatuses 300a, 300b and 300c, all of which have the same data, and of matching these pieces of read data. In the patrol process, the storage apparatuses 300a, 300b and 300c are accessed. The matching process of checking whether there is an error may be performed using a hash value, thereby leading to light network loads.

The recovery process is a process of recovering a redundancy level of data that is performed when some pieces of data stored in the storage apparatuses 300a, 300b and 300c are made inaccessible and redundancy of some pieces of data is broken due to a fault occurrence in the storage apparatuses 300a, 300b and 300c. In the recovery process, the network switch 100 assigns a new portion of the storage apparatus to a piece of data that has lost a predetermined redundancy level. The same data as the data stored in the portion of the storage apparatus that has been inaccessible due to a fault is copied to the newly assigned portion of the storage apparatus so as to recover the redundancy level.

In the recovery process, the network switch 100 first determines whether a fault has occurred in the storage apparatuses 300a, 300b and 300c.

Techniques to determine whether or not a fault has occurred include, for example, a method wherein an inspection command to detect a fault is transmitted from the network switch 100, and a determination is made according to the time that elapses before a response to the inspection command is received from a storage apparatus. In this method, the network switch 100 transmits an inspection command to a certain storage apparatus from among the storage apparatuses 300a, 300b and 300c and measures a response time T that elapses before a response to this command is received. It is then determined whether or not the period of the time T is longer than the period of a time T1 that is set in advance, and when the period of the response time T is longer than the period of the time T1, it is determined that a fault has occurred in the storage apparatus. The time T1, a standard for the extent of the time that elapses before a response to a transmitted inspection command is received, is, for example, one second, five seconds, thirty seconds, or one minute. In this example, a determination of whether or not a fault has occurred is made according to a response time that elapses before a response to one inspection command is received, but an inspection command may be transmitted a plurality of times so as to measure a plurality of response times, and a determination may be made according to these response times. Such a determination is effective for, for example, the following reason. When an inspection command is input to a storage apparatus during a process of relocating data, it takes a longer time to make a response than usual. In such a case, the network switch 100 transmits an inspection command to a storage apparatus a plurality of times at predetermined time intervals, and when the periods of all of the response times associated with the inspection commands are longer than the period of the time T1 that is set in advance, the network switch 100 may determine that a fault has occurred in the storage apparatus.

When the storage apparatuses 300a, 300b and 300c support a test unit ready command, this command may be used as the inspection command.

When it is determined that a fault has occurred in the storage apparatus 300a, 300b or 300c, the network switch 100 transmits a readout request to the storage apparatus in which a fault has occurred. In this case, due to the fault occurrence in the storage apparatus, access to the storage apparatus will result in an error. For the readout request, an error will be indicated when a storage apparatus including a primary slice has a fault (fails or is overloaded). Information related to a segment that indicates an error in reply to the readout request from the network switch 100 (an error segment) is obtained. The network switch 100 reassigns a slice to the error segment. That is, the network switch 100 references metadata of slices (a primary slice and a secondary slice) assigned to the segment having a fault. When a storage apparatus including these slices is the apparatus in which a fault has occurred, a recovery process of recovering the error segment will be started.

In the recovery process, first, a slice is reassigned to the error segment. As an example, when a fault occurs in a storage apparatus that includes a primary slice of the error segment, a primary slice will be reassigned. In this case, the primary slice is reassigned to an unused slice from among slices managed by a storage apparatus different from the storage apparatus 300a, 300b or 300c to which a secondary slice of the error segment is assigned. When the unused slice is determined, metadata is changed in such a manner that the slice that has been the secondary slice is used as the primary slice and the unused slice is used as the secondary slice. Data is then copied to recover a duplicated state for the error segment.

When a fault occurs in any of the storage apparatuses 300a, 300b and 300c, irrespective of whether there is user access, the relocating process unit 2008 performs a recovery process at a maintenance process speed determined by the maintenance-process speed determining unit 1002 of the network switch 100. Note that whether or not a fault has occurred is determined by the patrol process unit 2010.

At ordinary times, irrespective of whether there is user access, the maintenance process speed controlling unit 2014 performs a relocating process and/or a patrol process at a maintenance process speed determined by the maintenance-process speed determining unit 1002 of the network switch 100. In particular, in such a manner that a processing speed of an I/O process including a network I/O and an I/O of a storage apparatus related to the relocating process and/or the patrol process becomes the maintenance process speed determined by the maintenance-process speed determining unit 1002, the relocating process and the patrol process are performed while limiting bandwidth. The word "bandwidth", which is used here or will be used hereinafter, may simply indicate a processing speed.

When the patrol process unit 2010 detects a fault, the maintenance process speed controlling unit 2014 performs the recovery process while the storage apparatus 300a, 300b or 300c for which a recovery process stops a relocating process and/or a patrol process performed at ordinary times and while limiting the bandwidth to a maintenance process speed that has been set.

At ordinary times, when, for example, a certain period of time or longer passes after data is written to any of the storage apparatuses 300a, 300b and 300c, a patrol process may be performed; otherwise, a relocating process may be performed. Alternatively, when a usage rate of or loads on the storage apparatuses 300a, 300b and 300c, e.g., when the number of accesses to the storage apparatuses 300a, 300b and 300c that are made per unit time, are equal to or greater than a certain standard, a relocating process may be performed; otherwise, a patrol process may be performed.

When the patrol process unit 2010 determines that the plurality of storage apparatuses 300a, 300b and 300c are being operated normally, the maintenance process speed controlling unit 2014 gives an instruction to the relocating process unit 2012 and/or the patrol process unit 2010 to perform a relocating process and/or a patrol process, and, when the patrol process unit 2010 determines that the plurality of storage apparatuses 300a, 300b and 300c are not being operated normally, the maintenance process speed controlling unit 2014 gives an instruction to the recovery process unit 2008 to perform a recovery process.

In the patrol process, in order to check, for example, the consistency of duplicated data, the storage nodes 200a, 200b and 200c, each of which holds duplicated data, communicate with each other via the network switch 100. When a fault is detected in data managed by one storage node holding duplicated data, a recovery process is performed using corresponding data in another storage node.

The disk I/O unit 2016 is connected to the storage apparatuses 300a, 300b and 300c. The disk I/O unit 2016 communicates with I/O interfaces embedded in the storage apparatuses 300a, 300b and 300c and inputs data to or receives data output from the storage apparatuses 300a, 300b and 300c.

Whether it is an ordinary time or a time of fault occurrence, the disk I/O unit 2016 performs a user access process and a maintenance process in parallel with each other. In this case, the processes are performed while adjusting the bandwidth in such a manner that an observable processing speed of the system becomes constant.

When the storage apparatuses 300a, 300b and 300c include a plurality of HDDs and when the storage apparatuses 300a, 300b and 300c are formed using any of RAIDs 0 to 5 or a disk array is formed using a technology different from RAID, the disk I/O unit 2016 manages the plurality of HDDs as one HDD.

In conjunction with the maintenance process speed controlling unit 2014, the disk I/O unit 2016 adjusts loads of a maintenance process in accordance with a variation in a maintenance process speed in order to make constant an observable processing speed of the system.

That is, the disk I/O unit 2016 is operated as a processing speed controlling unit that makes an adjustment such that the sum of a user access process speed, a patrol speed, a relocating process speed, and a recovery process speed becomes a predetermined value. That is, when a throughput of the maintenance process (a maintenance process speed) is less than a predetermined value, the maintenance process is performed but a user access process is not performed. When the throughput of the maintenance process (the maintenance process speed) is not less than the predetermined value, the maintenance process is temporarily stopped, or the processing speed is decreased and a user access process is performed at a predetermined user access process speed.

FIG. 4 illustrates an exemplary hardware configuration of a storage node of an example of a multi-node storage system in accordance with an embodiment of the present invention.

The entirety of the storage node 200 is controlled by a CPU (central processing unit) 202. A memory 204, a disk I/O unit 206, a graphic process apparatus 208, an input interface 210, and a network I/O unit 212 are connected to the CPU 202 via a bus 214.

At least some of the programs of an OS (operating system) and some of the application programs, which are executed by the CPU 202, are stored in the memory 204. Various pieces of data required for processes performed by the CPU 202 are also stored in the memory 204.

The storage apparatus 300 is connected to the disk I/O unit 206. The disk I/O unit 206 includes a function that is the same as or similar to a function of the disk I/O unit 2016 illustrated in FIG. 3.

The graphic process apparatus 208 is used when an external monitor is directly connected to the storage node 200. In this example, the external monitor is not connected, but such a monitor may be temporarily connected to the storage node 200 for, for example, a maintenance management of the system 10. In accordance with an instruction from the CPU 202, the graphic process apparatus 208 causes the external monitor to display an image.

The I/O interface 210 is used when an input device such as a keyboard or a mouse is directly connected to the storage node 200. The I/O interface 210 transfers, to the CPU, information transmitted from the input device and related to a user input.

The network switch 100 is connected to the network I/O unit 212. The network I/O unit 212 includes a function that is the same as or similar to the network I/O unit 2002 illustrated in FIG. 3.

The user access process unit 2004 and the disk I/O unit 2016 form a user access process unit, wherein, in response to an access request to access data stored in any of the plurality of storage apparatuses 300a, 300b and 300c, the user access process unit performs a user access process of accessing the data at a user access process speed.

The patrol process unit 2010 and the maintenance process speed controlling unit 2014 of the data managing unit 2006 and the disk I/O unit 2016 form a patrol process unit that performs, at a patrol speed, a patrol process of confirming that the plurality of storage apparatuses 300a, 300b and 300c are being operated normally.

The relocating process unit 2012 and the maintenance process speed controlling unit 2014 of the data managing unit 2006 and the disk I/O unit 2016 form a relocating process unit that performs, at a relocating process speed, a relocating process of moving the data between the plurality of storage apparatuses 300a, 300b and 300c.

The recovery process unit 2008 and the maintenance process speed controlling unit 2014 of the data managing unit 2006 and the disk I/O unit 2016 form a recovery process unit that performs, at a recovery process speed, a recovery process of recovering a redundancy level of data when a fault occurs in any of the plurality of storage apparatuses 300a, 300b and 300c.

Such a hardware configuration may achieve a node apparatus of a multi-node storage system wherein an observable system processing speed achieved during a normal period during which a relocating process and a patrol process are performed in addition to a normal process under an instruction input by a user is the same as an observable system processing speed achieved during a fault occurrence period during which a recovery process is performed in addition to a normal process under an instruction input by the user.

<Processes at Storage Node>

Next, with reference to FIG. 5 to FIG. 7, processes performed by the storage node (the node apparatus) 200 will be described.

In the following, descriptions will be given of processes performed in a situation in which a thread for processing user access and a thread for performing a relocating process, a patrol process, or a recovery process are operated in parallel with each other. That is, the user access process unit 2004 and the data managing unit 2006 of the storage node apparatus 200 in FIG. 3 are operated in parallel with each other. FIG. 5 is a flowchart of processes performed by the user access process unit 2004 of the storage node apparatus 200 of the multi-node storage system 10. FIG. 6 is a flowchart of processes performed by the data managing unit 2006 of the storage node apparatus 200 of the multi-node storage system 10. Although the flowcharts in FIG. 5 and FIG. 6 include "START" and "END", the processes illustrated in FIG. 5 and FIG. 6 are actually performed repeatedly.

With reference to FIG. 5, processes performed by the user access process unit 2004 will be described.

In S102, a user access request to access data that has been received by the terminal 500, 600 or 700 is received via the network 400 and the network switch 100. The access request to access data includes a request to read data or a request to write data.

In S104, which follows S102, in response to the access request to access data received in S102, the access request to access data stored in the storage apparatus 300a, 300b or 300c, which forms a virtual storage apparatus, is issued to the disk I/O unit 2016.

In S106, the response issued in S104 from the storage apparatus 300a, 300b or 300c to the access request is obtained via the storage node 200a, 200b or 200c and the disk I/O unit 2016.

In S106, the time that elapses before the issued response to the access request is received may be measured as a response time. Using the response time, a user access process speed may be obtained.

In S108, the response obtained in S106 to the access request to access data stored in the storage apparatus 300a, 300b or 300c is transmitted to the terminal 500, 600 or 700 via the network I/O unit 2002, the network switch 100, and the network 400.

S100 to S106 form a user access step of, in response to an access request to access data stored in any of the plurality of storage apparatuses 300a, 300b and 300c, performing a user access process of accessing the data at a user access process speed.

Next, with reference to FIG. 6, processes performed by the data managing unit 2006 will be described. The data managing unit 2006 performs a maintenance process.

In S200, it is determined whether a recovery process is needed. When the patrol process unit 2010 detects a fault, the maintenance process speed controlling unit 2014 gives an instruction to the recovery process unit 2008 to perform a recovery process while limiting the bandwidth to a maintenance process speed that has been set. When a judgment of "Yes" is indicated in S200, i.e., when the recovery process is needed, the process shifts to S202. When a judgment of "No" is indicated in S200, i.e., when the recovery process is not needed, the process shifts to S204.

That is, when the patrol process unit determines that the plurality of storage apparatuses 300a, 300b and 300c are being operated normally, the maintenance process speed controlling unit 2014 performs a relocating process and/or a patrol process; when the patrol process unit determines that the plurality of storage apparatuses 300a, 300b and 300c are not being operated normally, the maintenance process speed controlling unit 2014 gives an instruction to perform a recovery process.

In S202, the recovery process is performed. This process is performed by the recovery process unit 2008. The recovery process unit 2008 performs the recovery process while limiting the bandwidth to a maintenance process speed that has been set. S202 forms a recovery process step in which, when some pieces of the data becomes inaccessible and redundancy of some pieces of the data is broken due to an occurrence of a fault in the plurality of storage apparatuses 300a, 300b and 300c, a recovery process of recovering the redundancy level of the data is performed at a recovery process speed.

In S204, a relocating process or a patrol process is performed. As described above, at ordinary times, irrespective of whether there is user access, the maintenance process speed controlling unit 2014 gives an instruction to the relocating process unit 2012 and/or the patrol process unit 2010 to perform a relocating process and/or a patrol process at a maintenance process speed determined by the maintenance-process speed determining unit 1002 of the network switch 100. In particular, in a manner such that a processing speed of an I/O process including a network I/O and an I/O of a storage apparatus related to the relocating process and/or the patrol process becomes the maintenance process speed determined by the maintenance-process speed determining unit 1002, the relocating process and the patrol process are performed while limiting bandwidth.

S204 forms a patrol process step of performing a patrol process at a patrol speed for confirming that the plurality of the storage apparatuses 300a, 300b and 300c are being operated normally and a relocating process step of performing a relocating process at a relocating process speed for moving the data between the plurality of storage apparatuses 300a, 300b and 300c.

At ordinary times of the system, regardless of whether a user makes a request to access data stored in the storage apparatus 300, the data managing unit 2006 performs a maintenance process for maintenance of the disk 300 at a predetermined speed.

Next, processes performed by the disk I/O unit 2016 will be described with reference to FIG. 7. Whether it is an ordinary time or a time of a fault occurrence, the disk I/O unit 2016 adjusts the bandwidth in such a manner that the user access process and the maintenance process are performed at the maintenance process speed determined by the maintenance-process speed determining unit 1002.

Figure 7:
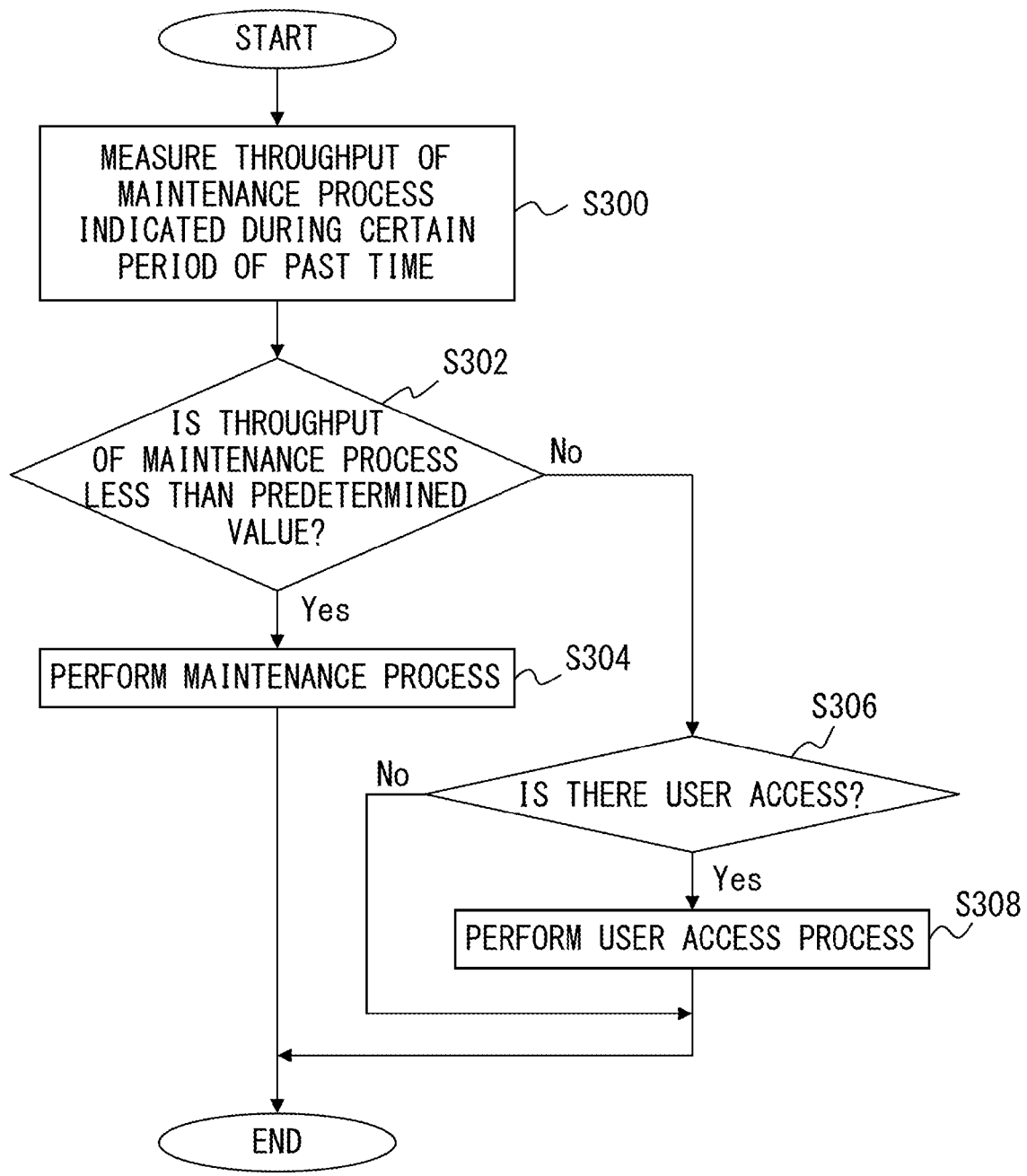
FIG. 7 is a flowchart of a disk I/O unit of a storage node of an example of a multi-node storage system in accordance with an embodiment of the present invention.

Portions related to the maintenance process are illustrated in FIG. 7. The user access process is performed in parallel with the processes illustrated in FIG. 7.

In this example, throughput is used as a processing speed.

In S300, statistics for maintenance process speeds (throughput of the maintenance process) indicated during a certain period of time in the past are obtained. In addition, in S300, the maintenance process speed for the certain period of time in the past is determined in accordance with the obtained statistics. This maintenance process speed may be an average value of the maintenance process speeds indicated during the certain period of time in the past. The process then shifts to S302.

In S302, it is determined whether the value of the maintenance process speed measured in S300 is lower than a predetermined value. When a judgment of "Yes" is indicated, i.e., when the maintenance process speed is less than the predetermined value, the process shifts to S304. An example of a judgment of "Yes" indicates a situation in which a throughput related to the maintenance process is less than the predetermined value. When a judgment of "No" is indicated, i.e., when the maintenance process speed is not less than the predetermined value, the process shifts to S306. As an example, a judgment of "No" indicates a situation in which a throughput related to the maintenance process is greater than the predetermined value. In this case, a user access process speed may possibly be less than a predetermined value.

Figure 6:
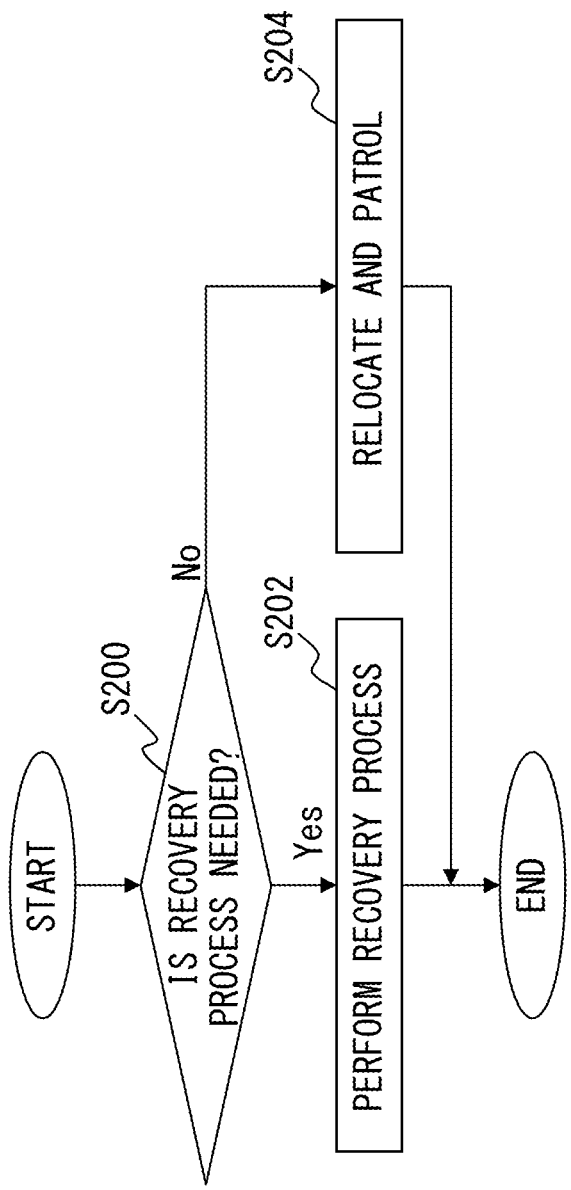
FIG. 6 is a flowchart of processes performed by a data management unit of a storage node of an example of a multi-node storage system in accordance with an embodiment of the present invention.

In S304, the maintenance process illustrated in FIG. 6 is performed. In particular, as illustrated in FIG. 6, the recovery process, the relocating process, or the patrol process is performed. That is, in this case, since the maintenance process speed is less than the predetermined value, performing the maintenance process does not affect the user access process speed.

In S306, it is determined whether there is a user access. When a judgment of "Yes" is indicated, i.e., when there is a user access, the process shifts to S308. When a judgment of "No" is indicated, i.e., when there is not a user access, the process ends.

In S308, the user access process is performed to prevent a performance observable to the user from changing.

S300 to S308 form a processing speed controlling step of adjusting the recovery process speed or the sum of the patrol process speed and the relocating process speed to be a predetermined value. Performing such a process allows the value of user access speeds achieved during a normal period during which a relocating process and a patrol process are performed in addition to normal user access processes of processing an instruction input by a user to become identical with the value of user access speeds achieved during a fault occurrence period during which a recovery process is performed in addition to the user access processes.

In the process above, when the throughput of the maintenance process (the maintenance process speed) is less than the predetermined value, the maintenance process is performed but the user access process is not performed.

Meanwhile, in the process above, when the throughput of the maintenance process (the maintenance process speed) is not less than the predetermined value, the user access process is performed to prevent a performance observable to the user from changing.

As described above, in the present embodiment, the throughput of the maintenance process that is indicated during a certain period of time in the past is measured, and, even when the value of the throughput is lower than a predetermined value, a performance observable to the user is prevented from being changed without performing the user access process.

Such a configuration allows a system to be achieved wherein an observable system processing speed achieved during a normal period during which a relocating process and a patrol process are performed in addition to a normal user access process of processing an instruction input by a user is the same as an observable system processing speed achieved during a fault occurrence period during which a recovery process is performed in addition to the user access process. As a result, the user access performance may be prevented from declining when a fault occurs. Moreover, during an occurrence of a fault, i.e., during a maintenance process, a performance that is observable to a user is not lowered, so that a user system can be readily designed.

<Modification>

A modification of the embodiment above will be described with reference to FIG. 8.

FIG. 8 illustrates a connection between storage apparatuses and storage nodes of another example of the multi-node storage system.

In this example, the network switch 100 in the aforementioned example is not present, and node apparatuses 800a, 800b and 800c (a representative node apparatus may hereinafter be referred to as a node apparatus 800) are each directly connected to their adjacent node apparatuses.

The node apparatus may hereinafter be simply referred to as a "node".

Figure 9:
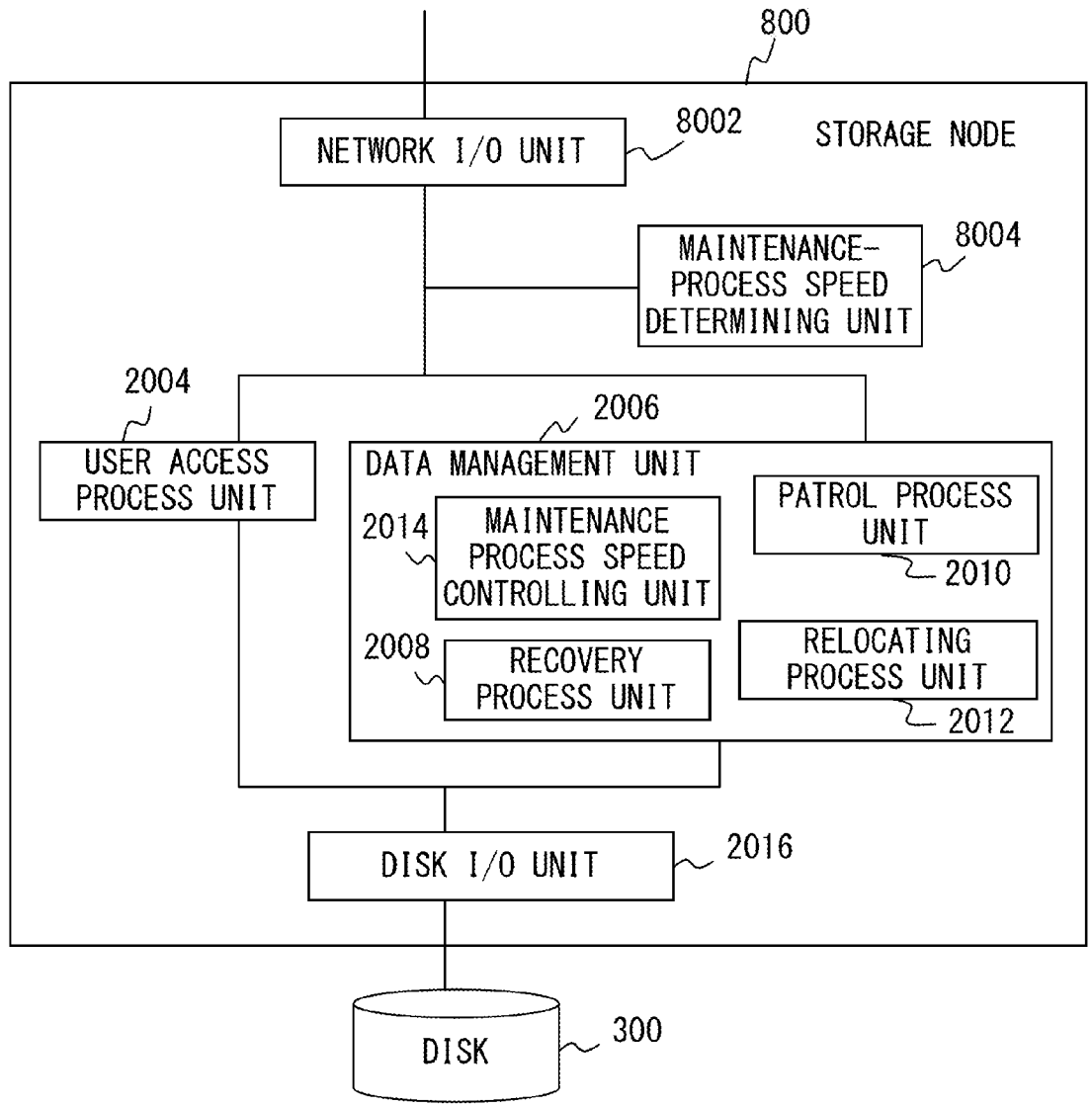
FIG. 9 is a functional block diagram of a storage node of another example of a multi-node storage system in accordance with an embodiment of the present invention.

FIG. 9 is a functional block diagram of a storage node 800 of another example of a multi-node storage system in accordance with an embodiment of the present invention. includes a processor that is configured to perform processes defined by below-mentioned units.

That is, the node apparatuses 800a, 800b and 800c include a network I/O unit 8002, a user access process unit 2004, a data management unit 2006, a maintenance-process speed determining unit 8004, and a disk I/O unit 2016.

In addition to a function of the network I/O unit 2002, the network I/O unit 8002 includes a function different from the maintenance-process speed determining unit of the network switch 100.

As an example, upon receipt of a report from another storage node that a new storage apparatus has been connected, the network I/O unit 8002 defines a new virtual storage apparatus, allows the newly connected storage apparatus to store data, and allows the stored data to be accessed.

The maintenance-process speed determining unit 8004 communicates with other maintenance-process speed determining units of other nodes and determines a maintenance process speed as a maximum value of a speed determined by each node. The maintenance process speed that has been determined in this way is shared by the nodes 800a, 800b and 800c.

The data management unit 2006 includes a recovery process unit 2008, a patrol process unit 2010, a relocating process unit 2012, and a maintenance process speed controlling unit 2014. Processes performed by these units are the same as those in the embodiment above.

The maintenance-process speed determining unit 8004 of each storage node receives a maintenance process speed determined by each storage node from the maintenance-process speed determining unit 8004 of another connected storage node and shares a maintenance process speed determined according to the sum of the received maintenance process speeds.

In FIG. 9, the maintenance-process speed determining unit 8002 is connected to the user access process unit 2004 and the data management unit 2006, but the arrangement is not necessarily limited to this.

In such a configuration, a speed at which the relocating process and the patrol process are performed during the normal period may be the same as a speed at which the recovery process is performed during the fault occurrence period. As a result, the user access performance may be prevented from being declined when a fault occurs. Moreover, during an occurrence of a fault, i.e., during a maintenance process, a performance that is observable to a user is not lowered, so that a user system can be readily designed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What we claimed is:

1. A storage management apparatus that manages a plurality of storage apparatuses in a storage system that disperses and stores in the plurality of storage apparatuses data that is made redundant so as to have a predetermined redundancy level, the storage management apparatus comprising:
    a patrol process unit that performs, at a patrol speed, a patrol process of confirming that the plurality of storage apparatuses are being operated normally;
    a relocating process unit that performs, at a relocating process speed, a relocating process of moving the data between the plurality of storage apparatuses;
    a recovery process unit that performs, at a recovery process speed, a recovery process of recovering the redundancy level of the data when a fault occurs in the plurality of storage apparatuses; and
    a processing speed control unit that outputs an instruction on an operation at the patrol process unit, the relocating process unit, and the recovery process unit in such a manner that the recovery process speed or a sum of the patrol process speed and the relocating process speed becomes a predetermined value.

2. The storage management apparatus according to claim 1 further comprises,
    a user access processing unit that performs, at a predetermined user access process speed, a user access process of accessing data stored in any of the plurality of storage apparatuses in response to an access request to access the data.

3. The storage management apparatus according to claim 1, wherein
    the processing speed control unit outputs an instruction to perform the relocating process and/or the patrol process when the patrol process unit determines that the plurality of storage apparatuses are being operated normally, and the processing speed controlling unit givens an instruction to perform the recovery process when the patrol process unit determines that the plurality of storage apparatuses are not being operated normally.

4. The storage management apparatus according to claim 2, wherein
when the recovery process speed or a sum of the patrol speed and the relocating process speed is less than a threshold, the processing speed control unit performs the patrol process and/or the relocating process in parallel with the user access process or performs the recovery process in parallel with the user access process.

5. The storage management apparatus according to claim 2, wherein
when the recovery process speed or a sum of the patrol process and the relocating process speed is not less than a threshold, the processing speed control unit performs the user access process.

6. The storage management apparatus according to claim 1 further comprises,
a maintenance processing speed determining unit determine a maintenance speed defined by the recovery process speed or the sum of the patrol process speed and the relocating process speed.

7. A storage management method for managing a plurality of storage apparatuses in a storage system that disperses and stores in the plurality of storage apparatuses data that is made redundant so as to have a predetermined redundancy level by using a processor, the storage management method comprising:
performing, at a patrol speed, a patrol process of confirming that the plurality of storage apparatuses are being operated normally by using the processor;
performing, at a relocating process speed, a relocating process of moving the data between the plurality of storage apparatuses by using the processor;
performing, at a recovery process speed, a recovery process of recovering the redundancy level of the data when a fault occurs in the plurality of storage apparatuses by using the processor; and
making an adjustment such that the recovery process speed or a sum of the patrol process speed and the relocating process speed becomes a predetermined value by using the processor.

8. The method according to claim 7, further comprising:
performing, at a predetermined user access process speed, a user access process of accessing data stored in any of the plurality of storage apparatuses in response to an access request to access the data by using the processor.

9. The method according to claim 7, wherein
the making of the adjustment such that the recovery process speed or the sum of the patrol process speed and the relocating process speed becomes the predetermined value by using the processor includes
giving an instruction to perform the relocating process and/or the patrol process when the patrol process unit determines that the plurality of storage apparatuses are being operated normally by using the processor, and
giving an instruction to perform the recovery process when the patrol process unit determines that the plurality of storage apparatuses are not being operated normally by using the processor.

10. The method according to claim 8, wherein
the making of the adjustment such that the recovery process speed or the sum of the patrol process speed and the relocating process speed becomes the predetermined value by using the processor includes
when the recovery process speed or the sum of the patrol process speed and the relocating process speed is less than a threshold, performing the patrol process and/or the relocating process in parallel with the user access process or performing the recovery process in parallel with the user access process by using the processor.

11. The method according to claim 8, wherein
the making of the adjustment such that the recovery process speed or the sum of the patrol process speed and the relocating process speed becomes the predetermined value by using the processor includes
when the recovery process speed or the sum of the patrol process speed and the relocating process speed is not less than a threshold, performing the user access process by using the processor.

12. The method according to claim 7, further comprising:
determining a maintenance speed defined by the recovery process speed or the sum of the patrol process speed and the relocating process speed by using the processor.

13. A storage system that stores data that is made redundant so as to have a predetermined redundancy level in a plurality of storage apparatuses, each of the plurality of storage apparatuses comprising:
a patrol process unit that performs, at a patrol speed, a patrol process of confirming that the plurality of storage apparatuses are being operated normally;
a relocating process unit that to performs, at a relocating process speed, a relocating process of moving the data between the plurality of storage apparatuses;
a recovery process unit that performs, at a recovery process speed, a recovery process of recovering the redundancy level of the data when a fault occurs in the plurality of storage apparatuses;
a processing speed control unit that outputs an instruction on an operation at the patrol process unit, the relocating process unit, and the recovery process unit in such a manner that the recovery process speed or a sum of the patrol process speed and the relocating process speed becomes a predetermined value; and
a maintenance processing speed determining unit that determines in advance a maintenance speed defined by the recovery process speed or the sum of the patrol process speed and the relocating process speed.

14. The storage system to claim 13 further comprises,
a user access processing unit that performs, at a user access process speed, a user access process of accessing data stored in any of the plurality of storage apparatuses in response to an access request to access the data.

15. The storage system according to claim 13, wherein
the processing speed control unit performs the relocating process and/or the patrol process when the patrol process unit determines that the plurality of storage apparatuses are being operated normally, and the processing speed controlling unit performs the recovery process when the patrol process unit determines that the plurality of storage apparatuses are not being operated normally.

16. The storage system according to claim 14, wherein
when the recovery process speed or a sum of the patrol speed and the relocating process speed is less than a threshold, the processing speed control unit performs the patrol process and/or the relocating process in parallel with the user access process or performs the recovery process in parallel with the user access process.

17. The storage system according to claim 14, wherein
when the recovery process speed or a sum of the patrol speed and the relocating process speed is not less than a threshold, the processing speed control unit is configured to perform the user access process.

18. The storage system according to claim 13, wherein
the maintenance processing speed determining unit determines the maintenance speed in advance by making an access corresponding to a pattern of an assumed typical access from outside simultaneously with an access corresponding to the recovery process.

19. The apparatus according to claim 13, wherein
the maintenance processing speed determining unit determines in advance the maintenance speed according to the number of times per second a reading/writing process is performed in performing of reading/writing under a mixed pattern of random writing at a certain throughput.

20. The apparatus according to claim 13, wherein
the maintenance processing speed determining unit determines the maintenance speed in advance in consideration of reliability information of a device including an average failure interval.

* * * * *